US012598525B2

(12) United States Patent　　　(10) Patent No.:　US 12,598,525 B2

Rahman　　　　　　　　　　　　　(45) Date of Patent:　　Apr. 7, 2026

(54) COMFORT NOISE GENERATION DURING HANDOVER FOR USER EQUIPMENT (UE) IN WIRELESS COMMUNICATION NETWORKS

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 322 days.

(21) Appl. No.: 18/343,907

(22) Filed: Jun. 29, 2023

(65) Prior Publication Data

US 2025/0008397 A1　　Jan. 2, 2025

(51) Int. Cl.
　*H04W 36/08*　　　(2009.01)
　*G10L 19/012*　　(2013.01)
　*H04W 36/38*　　　(2009.01)

(52) U.S. Cl.
　CPC ........... *H04W 36/08* (2013.01); *G10L 19/012* (2013.01); *H04W 36/38* (2013.01)

(58) Field of Classification Search
　CPC .................................................. H04W 36/08
　See application file for complete search history.

(56) References Cited

U.S. PATENT DOCUMENTS

| | | | | |
|---|---|---|---|---|
| 5,146,609 | A * | 9/1992 | Tayloe ................... | H04W 36/38 |
| | | | | 455/63.1 |
| 8,718,645 | B2 | 5/2014 | Anderton et al. | |
| 9,622,134 | B2 | 4/2017 | Sundararajan et al. | |
| 9,681,344 | B1 | 6/2017 | Oroskar et al. | |
| 10,506,004 | B2 | 12/2019 | Reddappagari et al. | |
| 11,109,440 | B2 | 8/2021 | Haartsen | |
| 2008/0002620 | A1* | 1/2008 | Anderton .............. | F24F 5/0035 |
| | | | | 370/350 |
| 2008/0214225 | A1* | 9/2008 | Choukroun ........... | H04W 52/40 |
| | | | | 455/522 |
| 2015/0289168 | A1* | 10/2015 | Jafry ..................... | H04W 36/14 |
| | | | | 455/436 |
| 2016/0014591 | A1* | 1/2016 | Sekaran .............. | H04M 7/0075 |
| | | | | 455/411 |
| 2025/0071652 | A1* | 2/2025 | Rune ................. | H04W 36/0033 |

* cited by examiner

*Primary Examiner* — Barry W Taylor

(57)　　　　　　　ABSTRACT

Various embodiments comprise a wireless communication network to provide comfort noise during handover. The wireless communication network comprises a source access node and a wireless user device. During a voice call, the source access node detects handover conditions for the wireless user device. The source access node signals a target access node to serve the wireless user device transfers a handover command to the wireless user device. The wireless user device receives the handover command from the source access node. The wireless user device detaches from the source access node and wirelessly transfers attachment signaling to the target access node. The wireless user device sets a handover timer and determines when the handover timer expires. In response to the handover command and the expiration of the handover timer, the wireless user device generates comfort noise and delivers the comfort noise to the user.

20 Claims, 11 Drawing Sheets

200➤

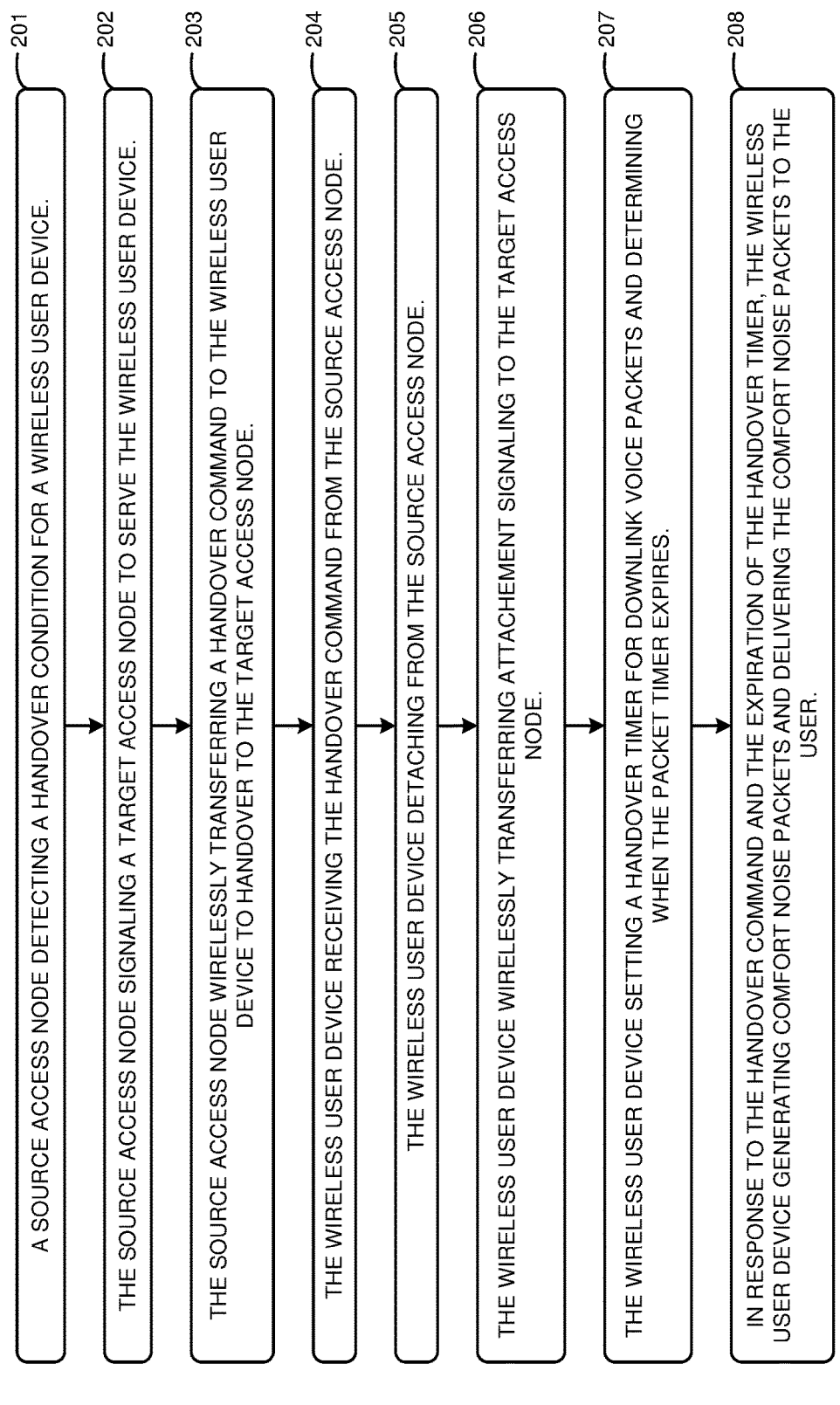

201 — A SOURCE ACCESS NODE DETECTING A HANDOVER CONDITION FOR A WIRELESS USER DEVICE.

202 — THE SOURCE ACCESS NODE SIGNALING A TARGET ACCESS NODE TO SERVE THE WIRELESS USER DEVICE.

203 — THE SOURCE ACCESS NODE WIRELESSLY TRANSFERRING A HANDOVER COMMAND TO THE WIRELESS USER DEVICE TO HANDOVER TO THE TARGET ACCESS NODE.

204 — THE WIRELESS USER DEVICE RECEIVING THE HANDOVER COMMAND FROM THE SOURCE ACCESS NODE.

205 — THE WIRELESS USER DEVICE DETACHING FROM THE SOURCE ACCESS NODE.

206 — THE WIRELESS USER DEVICE WIRELESSLY TRANSFERRING ATTACHEMENT SIGNALING TO THE TARGET ACCESS NODE.

207 — THE WIRELESS USER DEVICE SETTING A HANDOVER TIMER FOR DOWNLINK VOICE PACKETS AND DETERMINING WHEN THE PACKET TIMER EXPIRES.

208 — IN RESPONSE TO THE HANDOVER COMMAND AND THE EXPIRATION OF THE HANDOVER TIMER, THE WIRELESS USER DEVICE GENERATING COMFORT NOISE PACKETS AND DELIVERING THE COMFORT NOISE PACKETS TO THE USER.

COMFORT NOISE GENERATION DURING HANDOVER FOR USER EQUIPMENT (UE) IN WIRELESS COMMUNICATION NETWORKS

TECHNICAL FIELD

Various embodiments of the present technology relate to User Equipment (UE) handover, and more specifically, to generating comfort noise during handover.

BACKGROUND

Wireless communication networks provide wireless data services to wireless user devices. Exemplary wireless data services include machine-control, internet-access, media-streaming, online gaming, and social-networking. Exemplary wireless user devices comprise phones, computers, vehicles, robots, and sensors. Radio Access Networks (RANs) exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores over backhaul data links. The core networks execute network functions to provide wireless data services to the wireless user devices over the RANs.

The RANs provide wireless service to wireless user devices in geographic regions referred to as sectors. When a wireless user device moves from a sector served by a first RAN to a sector served by a second RAN, the wireless user device detaches from the first RAN and attaches to the second RAN in a process referred to as handover. To detect handover conditions, the wireless user device measures received signal strength of nearby RANs and generates a measurement report that characterizes measured signal strengths and transfers the measurement report to its serving RAN. The serving RAN compares the measured signal strengths to a handover threshold and directs the user device to handover to a target RAN when the threshold is triggered. The time needed to complete the handover process to the target RAN can range from near instantaneous to several minutes.

Break-before-make handover is a type of handover where the wireless user device detaches from the source RAN before attaching to a target RAN. When the user device has detached from the source RAN and before the user device has established a connection with the target RAN, the user device is unable to send or receive user data to the wireless communication network. When the time to handover in break-before-make handover is excessive, active multimedia sessions like voice calls that the user device is participating in are negatively impacted due to the user device's inability to exchange data with the network. This degrades the user experience. Unfortunately, wireless communication networks do not effectively or efficiently mitigate the effects of the connection lapse during break-before-make handover on active multimedia sessions.

Overview

This Overview is provided to introduce a selection of concepts in a simplified form that are further described below in the Technical Description. This summary is not intended to identify key features or essential features of the claimed subject matter, nor is it intended to be used as an aid in determining the scope of the claimed subject matter.

Various embodiments of the present technology relate to solutions to handover wireless User Equipment (UE). Some embodiments comprise a method of operating a wireless communication network to provide comfort noise during handover. The method comprises a source access node detecting a handover condition for a wireless user device during a voice call. The method further comprises the source access node signaling a target access node to serve the wireless user device and wirelessly transferring a handover command to the wireless user device to handover to the target access node. The method further comprises the wireless user device receiving the handover command from the source access node, detaching from the source access node, and wirelessly transferring attachment signaling to the target access node. The method further comprises the wireless user device setting a handover timer and determining when the handover timer expires. The method further comprises the wireless user device generating comfort noise packets in response to the handover command and expiration of the handover timer and delivering the comfort noise packets to the user.

Some embodiments comprise a wireless communication network configured to provide comfort noise during handover. The wireless communication network comprises a source access node and a wireless user device. During a voice call, the source access node detects a handover condition for the wireless user device. The source access node signals a target access node to serve the wireless user device and wirelessly transfers a handover command to the wireless user device to handover to the target access node. The wireless user device receives the handover command from the source access node. The wireless user device detaches from the source access node and wirelessly transfers attachment signaling to the target access node. The wireless user device sets a handover timer and determines when the handover timer expires. In response to the handover command and expiration of the handover timer, the wireless user device generates comfort noise and delivers the comfort noise to the user.

Some embodiments comprise a user device configured to provide comfort noise during handover. The user device comprises radio circuitry and device circuitry. The radio circuitry wirelessly exchanges voice packets for a voice call with a source access node. The radio circuitry receives a handover command that indicates a target access node from the source access node and transfers the handover command to device circuitry. The device circuitry receives the handover command, detaches from the source access node, and transfers attachment signaling for the target access node to the radio circuitry. The radio circuitry wirelessly transfers the attachment signaling to the target access node. The device circuitry sets a handover timer and determines when the handover timer expires. In response to the handover command and expiration of the handover timer, the device circuitry generates comfort noise and delivers the comfort noise to the user.

DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 2 illustrates an exemplary operation of the wireless communication network to induce comfort noise in the wireless user device during handover.

Figure 1:
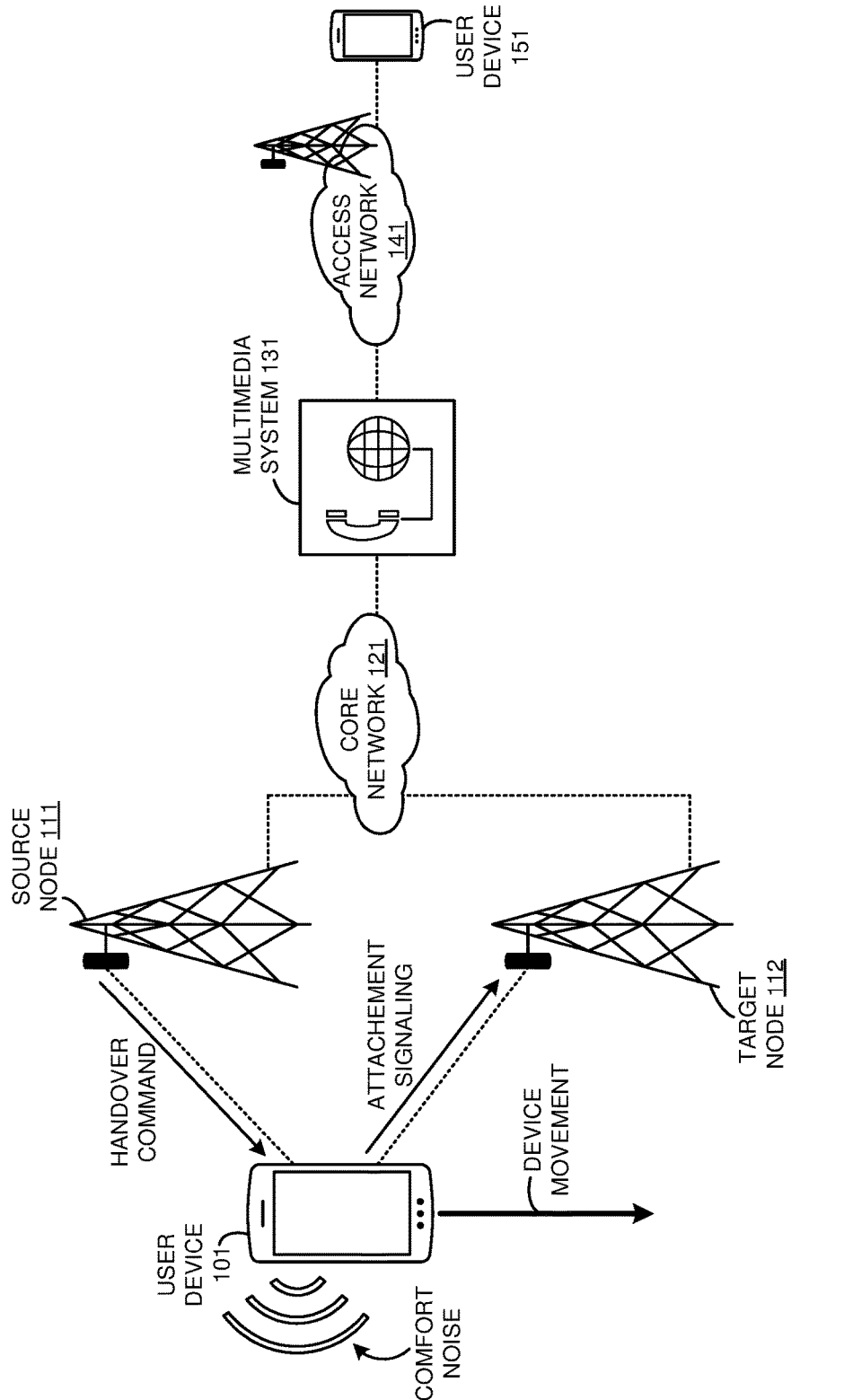
FIG. 1 illustrates a wireless communication network to induce comfort noise in a wireless user device during handover.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

TECHNICAL DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates wireless communication network 100 to induce comfort noise in a wireless user device during handover. Wireless communication network 100 delivers services like voice calling, internet-access, media-streaming, machine communications, or some other wireless communications product to user devices. Wireless communication network 100 comprises user device 101, source node 111, target node 112, core network 121, multimedia system 131, access network 141, and user device 151. In other examples, wireless network communication network 100 may comprise additional or different elements than those illustrated in FIG. 1.

Various examples of network operation and configuration are described herein. In some examples, user device participates in a voice call with user device 151 over source node 111, core network 121, multimedia system 131, and access network 141. Voice calls typically comprise the exchange of uplink and downlink voice data packets between two or more user devices. For example, user device 101 may generate uplink voice data packets and wirelessly transfer the uplink packets to source node 111. Source node 111 forwards the uplink packets to core network 121. Core network 121 interfaces with multimedia system 131 to route the uplink packets for delivery to user device 151 over access network 141. Likewise, user device 101 may wirelessly receive downlink voice packets over source node 111 that were generated by user device 151.

At some point during the voice call, source access node 111 detects handover conditions for user device 101. Handover entails a user device detaching from a source access node and wirelessly attaching to a target access node. Typically, handover conditions occur when the received signal strength at the user device for the source node falls below a threshold value and/or the received signal strength at the user device for the target access node exceeds a threshold value. Exemplary handover threshold types include A1 events, A2 events, A3 events, A4 events, A5 events, B1 events, and B2 events. A source access node may detect handover conditions by receiving measurement reports from the user device that characterize the received signal strengths at the device for the source node and one or more target nodes and applying the signal strengths to corresponding handover thresholds. In this example, the handover conditions were created by user device 101 moving out of the coverage range for source node 111 as illustrated in FIG. 1.

In response to detecting the handover conditions, source access node 111 wirelessly transfers a handover command to user device 101. Source access node 111 also directs target node 112 to serve user device 101. Source node 111 may possess a direct connection with target node 112 (e.g., X2 link) or may communicate with target node 112 indirectly through core network 121. User device 101 receives the handover command and detaches from source node 111. User device 101 wirelessly transfers attachment signaling to target 112. By detaching from source node 111 before attaching to target node 112 (i.e., break-before-make handover), the user data flow for the voice call between devices 101 and 151 is temporarily interrupted.

User device 101 sets a handover timer and measures for downlink packets generated by user device 151 and received over target node 112. The handover timer establishes a period of time device 101 may go without receiving downlink voice packets before user device 101 begins generating comfort noise for the user. The timer may last any amount of time but is typically brief. For example, user device 101 may set a handover timer that lasts 160 ms. If user device 101 receives a downlink voice packet generated by user device 151 and received over target node 112 before the handover timer expires, device 101 disables the timer and the voice call may resume.

However, if the handover timer expires before user device 101 receives a downlink voice packet (e.g., the connection with target node 112 is not yet established), user device 101 generates comfort noise and delivers the comfort noise to the user. Comfort noise comprises synthetic background noise to notify the user that the call is still active during a period of silence to improve the overall user experience. For example, the comfort noise may simulate noise associated with outdoor environment (e.g., wind), human activity (e.g., footsteps), animal activity (e.g., bird songs), and the like. User device 101 continues to measure for downlink voice user data from device 151 over target node 112. Upon successfully connecting with target node 112, target node 112 wirelessly transfers user data for the voice call to user device 101. User device 101 detects the user data and responsively ceases generating comfort noise and the voice call may resume.

Wireless communication network 100 provides wireless data services to user device 101 like voice calling, video conferencing, text message services, internet-access, media-streaming, machine communications, and the like. Exemplary user devices include phones, wearables, computers, vehicles, robots, and sensors. Nodes 111 and 112 exchange wireless signals with user device 101 over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). Nodes 111 and 112 are connected to core network 121 over backhaul data links. Nodes 111 and 112 exchange network signaling and user data with network elements in core network 121. Nodes 111 and 112 may comprise wireless access points, Radio Access Networks (RANs), edge computing systems, or other types of wireless access systems to provide the wireless links, backhaul data links, and/or edge computing services between user device 101 and core network 121.

Nodes 111 and 112 may comprise Fifth Generation (5G) RANs, LTE RANS, gNodeBs, eNodeBs, NB-IoT access nodes, LP-WAN base stations, wireless relays, WIFI hotspots, Bluetooth access nodes, and/or other types of wireless network transceiver. Access nodes 111 and 112 may comprise Radio Units (RUs), Distributed Units (DUs) and Centralized Units (CUs). Access nodes 111 and 112 may comprise Baseband Units (BBUs). For example, radio circuitry 111 may comprise an RU and node circuitry 112 may comprise a DU and a CU. The RUs may be mounted at elevation and have antennas, modulators, signal processors, and the like. The RUs are connected to the DUs or BBUs which are usually nearby network computers. The DUs handle lower wireless network layers like the Physical Layer (PHY), Media Access Control (MAC), and Radio Link Control (RLC). The DUs are connected to the CUs which are larger computer centers that are closer to core network 121. The CUs handle higher wireless network layers like the Radio Resource Control (RRC), Service Data Adaption Protocol (SDAP), and Packet Data Convergence Protocol (PDCP). The CUs are coupled to network functions in core network 121. The BBUs handle wireless network layers like RRC, PDCP, RLC, MAC, and PHY. The BBUs are coupled to network functions in core network 121.

Core network 121 and multimedia system 131 are representative of computing systems that provide wireless data services to user device 101 over nodes 111 and 112. Exemplary computing systems comprise data centers, edge computing networks, cloud computing networks, application servers, and the like. The computing systems of core network 121 store and execute the network functions to provide wireless data services to user device 101 over access nodes 110 and 120. Exemplary network functions include Access and Mobility Management Function (AMF), Session Management Function (SMF), User Plane Function (UPF), Mobility Management Entity (MME), Serving Gateway (SGW) and Packet Data Network Gateway (PGW). Core network 121 may comprise a Fifth Generation Core (5GC) architecture and/or an Evolved Packet Core (EPC) architecture.

The computing systems of multimedia system 131 execute multimedia functions to provide services like voice calling and text messaging to user device 101. Exemplary multimedia functions include Call State Control Function (CSCF), Telephony Application Server (TAS), and Short Message Service Application Server (SMS AS). Multimedia system 131 may comprise an Internet Protocol Multimedia Subsystem (IMS) core architecture. Multimedia system 131 establishes multimedia sessions like voice calls, video calls, and text messaging between endpoint devices. For example, multimedia system 131 may receive a text message sent by user device 101 and route the text message to the message destination. In this example, multimedia system establishes the end-to-end connection between user device 101 and user device 151 that traverses nodes 111/112, core network 121, multimedia system 131, and access network 141. Access network 141 is representative of the various core network, transport network, and/or radio network to exchange the user data for the voice call with user device 151.

FIG. 2 illustrates process 200. Process 200 comprises an exemplary operation of wireless communication network 100 to induce comfort noise in a wireless user device during handover. The operation may vary in other examples. The operations of process 200 comprise a source access node detecting a handover condition for a wireless user device (step 201). The operations further comprise the source access node signaling a target access node to serve the wireless user device (step 202). The operations further comprise the source access node wirelessly transferring a handover command to the wireless user device to handover to the target access node (step 203). The operations further comprise the wireless user device receiving the handover command from the source access node (step 204). The operations further comprise the wireless user device detaching from the source access node (step 205). The operations further comprise the wireless user device wirelessly transferring attachment signaling to the target access node (step 206). The operations further comprise the wireless user device setting a handover timer for downlink voice packets and determining when the handover timer expires (step 207). In response to the handover command and the expiration of the handover timer, the operations further comprise the wireless user device generating comfort noise packets and delivering the comfort noise packets to the user (step 208).

Figure 3:
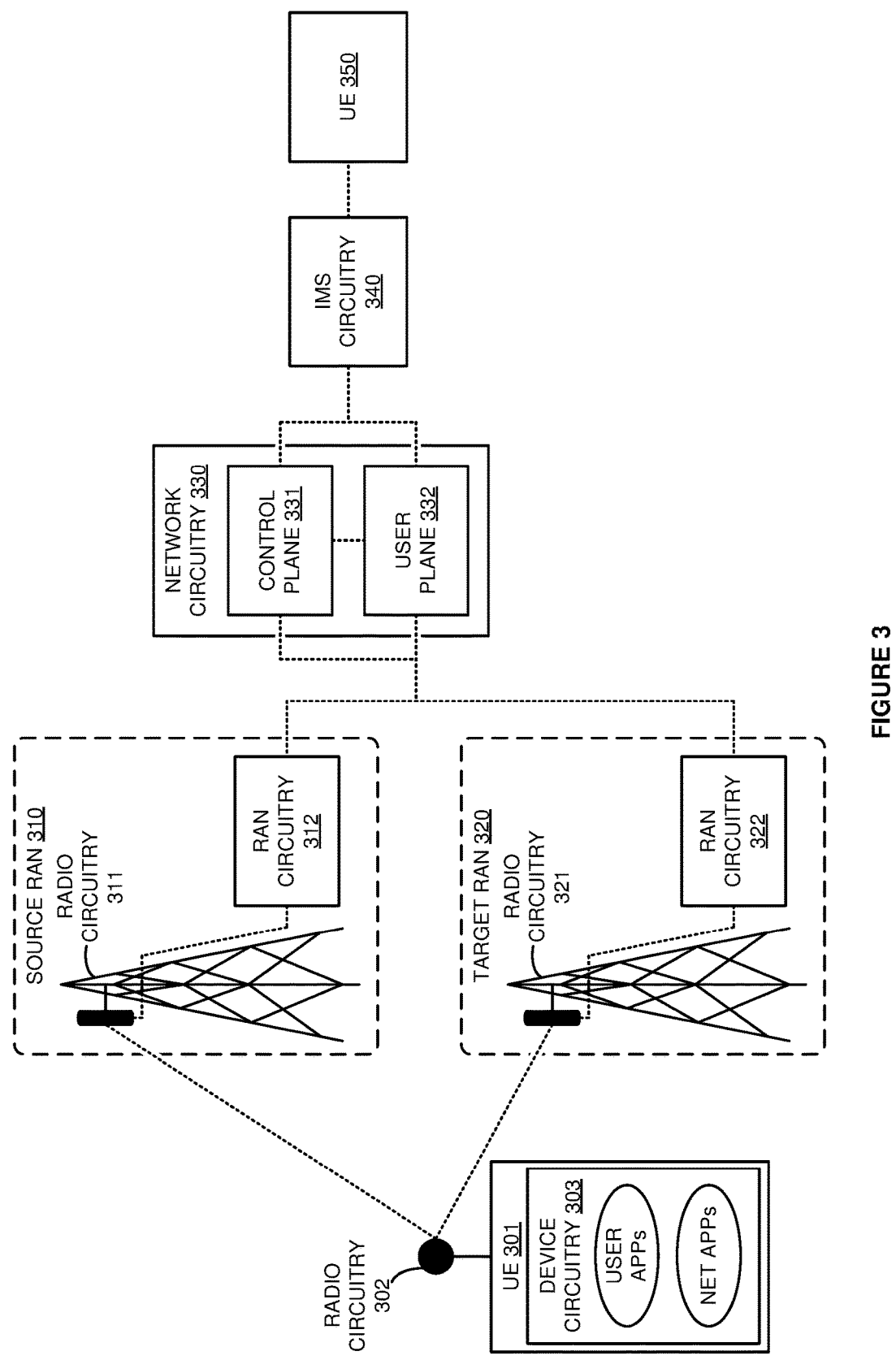
FIG. 3 illustrates a wireless communication network to induce comfort noise in a wireless User Equipment (UE) during handover.

FIG. 3 illustrates wireless communication network 300 network to induce comfort noise in a User Equipment (UE) during handover. Wireless communication network 300 is an example of wireless network 100, however network 100 may differ. Wireless communication network 300 comprises UE 301, source RAN 310, target RAN 320, network circuitry 330, IMS circuitry 340, and UE 350. UE 301 comprises radio circuitry 302 and device circuitry 303. Device circuitry 303 hosts user applications (USER APPs) and network applications (NET APPs). Source RAN 310 comprises radio circuitry 311 and RAN circuitry 312. Target RAN 320 comprises radio circuitry 321 and RAN circuitry 322. Network circuitry 330 comprises control plane 331 and user plane 332. In other examples, wireless network 300 may comprise additional or different elements than those illustrated in FIG. 3.

In some examples, UE 301 attaches to source RAN 310. UE 301 exchanges registration signaling with control plane 331 and IMS circuitry 340 to register for wireless data and IMS services. Upon registration with network circuitry 330 and IMS circuitry 340, UE 301 initiates a voice call with UE 350. UE 301 exchanges voice packets for the call with source RAN 310. Source RAN 310 exchanges the voice packets with user plane 332. User plane 332 interfaces with IMS circuitry 340 to exchange the voice packets with UE 350.

During the voice call, UE 301 measures received signal strength for source RAN 310 and target RAN 320. Exemplary signal strength measurements include Reference Signal Received Power (RSRP), Reference Signal Received Quality (RSRQ), and Reference Signal Strength Indicator (RSSI). UE 301 generates a measurement report that includes the signal strength measurements for RANs 310 and 320 and wirelessly transfers the measurement report to source RAN 310. RAN circuitry 312 compares the signal strength measurements to a handover threshold and responsively detects handover conditions for UE 301. For example, UE 301 may have moved to a new geolocation outside of the effective service range of RAN 310. In response to detecting the handover conditions, RAN circuitry 312 selects target RAN 320 for handover. RAN circuitry 312 transfers a handover required message to control plane 331 and directs target RAN 320 to serve UE 320. Control plane 331 controls user plane 332 to transfer voice session from source RAN 310 to target RAN 320. RAN circuitry 312 wirelessly transfers a handover command to UE 301 directing UE 301 to detach from source RAN 310 and attach to target RAN 320 over radio circuitry 311.

UE 301 wirelessly receives the handover command and detaches from RAN 310 before attaching to target RAN 320. UE 301 wirelessly transfers attachment signaling to target RAN 320. During the period when UE 301 is detached from source RAN 310 and before UE 301 has established a connection with target RAN 320, UE 301 cannot receive downlink packets or transmit uplink packets for the voice call. UE 301 sets a handover timer to determine when to generate comfort noise for the user and measures for downlink packets. For example, the network applications hosted by device circuitry 303 may receive the handover required message and direct the user applications to set the handover timer and measure for downlink voice packets for the voice call. In this example, the length of the attachment process with target RAN 320 exceeds the handover timer resulting in the expiration of the handover timer. In response, UE 301 generates comfort noise and delivers the comfort noise to the user. Subsequently, UE 301 establishes a connection with target RAN 320 completing the handover. Target RAN 320 wirelessly exchanges voice packets for the call to UE 301. UE 301 detects the exchange of voice packets and responsively stops generating comfort noise.

Advantageously, wireless communication network 300 effectively mitigates the effects of the connection lapse during break-before-make handover on active multimedia sessions. Moreover, UE 301 efficiently detects excessive handover times and generates comfort noise when the handover time is excessive.

UE 301, RAN 310, and RAN and 320 communicate over links using wireless technologies like 5GNR, LTE, LP-WAN, WIFI, Bluetooth, and/or some other type of wireless or wireline networking protocol. The wireless technologies use electromagnetic frequencies in the low-band, mid-band, high-band, or some other portion of the electromagnetic spectrum. RAN 310, RAN 320, and network circuitry 330 communicate over various links that use metallic links, glass fibers, radio channels, or some other communication media. The links use Fifth Generation Core (5GC), Evolved Packet Core (EPC), IEEE 802.3 (ENET), Time Division Multiplex (TDM), Data Over Cable System Interface Specification (DOCSIS), Internet Protocol (IP), General Packet Radio Service Transfer Protocol (GTP), 5GNR, LTE, WIFI, virtual switching, inter-processor communication, bus interfaces, and/or some other data communication protocols.

UE 301 may comprise a phone, vehicle, computer, sensor, drone, robot, or another type of data appliance with wireless and/or wireline communication circuitry. Although RANs 310 and 320 are illustrated as towers, RANs 310 and 320 may comprise other types of mounting structures (e.g., buildings), or no mounting structures at all. UE 301, RAN 310, and RAN 320 comprise antennas, amplifiers, filters, modulation, analog/digital interfaces, microprocessors, software, memories, transceivers, bus circuitry, and the like. Control plane 321 comprises network functions and network elements like MME, AMF, SMF, and the like. User plane 322 comprises network functions and network elements like UPF, SGW, PGW, and the like.

UE 301, RANs 310 and 320, and network circuitry 330 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), Field Programmable Gate Array (FPGA), and/or the like. The memories comprise Random Access Memory (RAM), flash circuitry, Solid State Drives (SSD), Non-Volatile Memory Express (NVMe) SSDs, Hard Disk Drives (HDDs), and/or the like. The memories store software like operating systems, user applications, radio applications, network functions, and multimedia functions. The microprocessors retrieve the software from the memories and execute the software to drive the operation of wireless communication network 300 as described herein.

Figure 4:
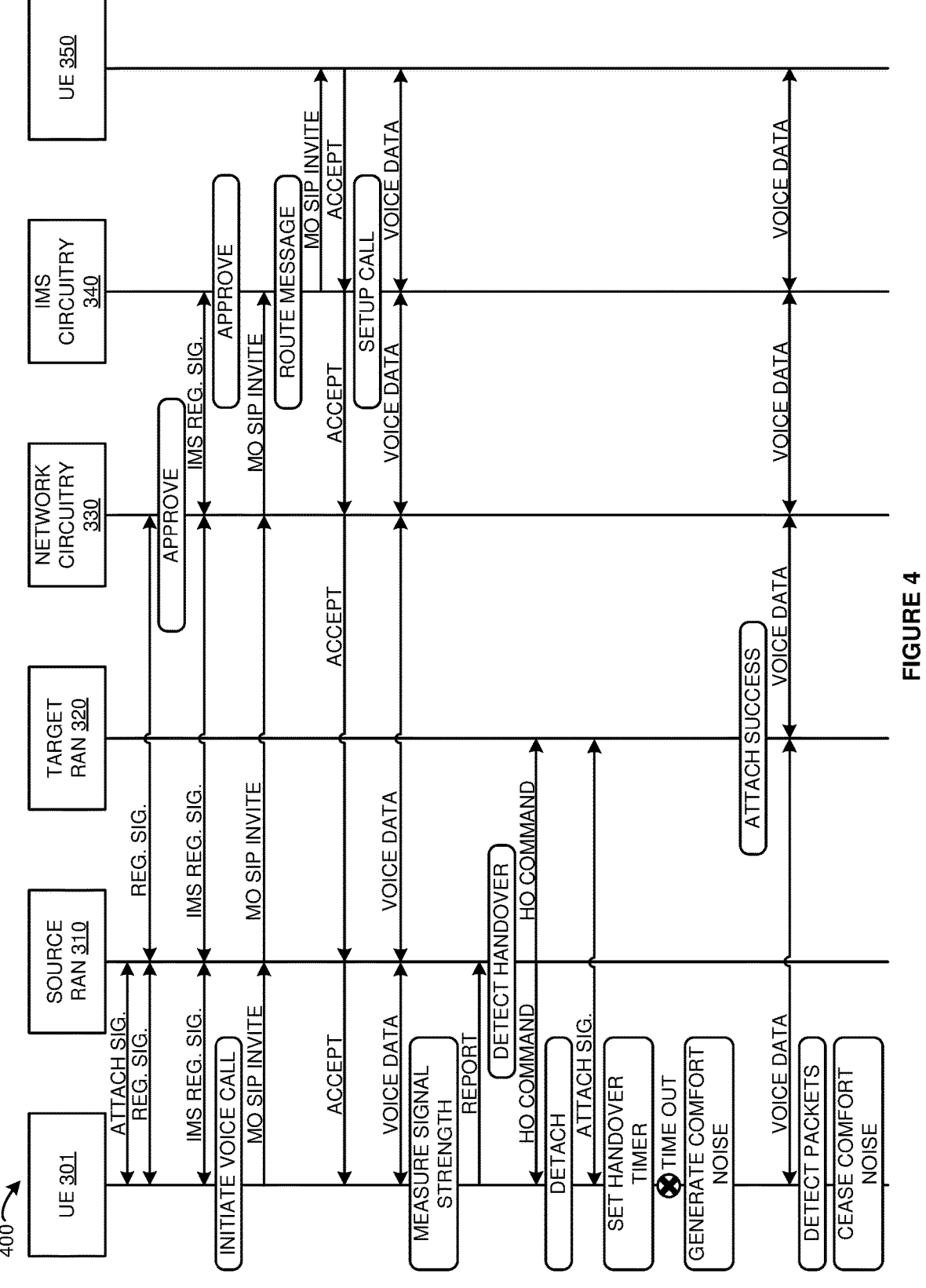
FIG. 4 illustrates an exemplary operation of the wireless communication network to induce comfort noise in the wireless UE during handover.

FIG. 4 illustrates process 400. Process 400 comprises an exemplary operation of wireless communication network 300 to induce comfort noise in a UE during handover. The operation may vary in other examples. In operation, UE 301 wirelessly exchanges attachment signaling (ATTACH SIG.) with source RAN 310 to establish a wireless connection. Once the connection is established, UE 301 exchanges registration signaling (REG. SIG.) with network circuitry 330 over source RAN 310. To register for wireless services, UE 301 transfers a registration request to control plane 331 in network circuitry 330. Control plane 331 processes the registration request to authenticate the identity of UE 301 and authorize UE 301 for wireless service. Network circuitry 330 approves the registration of UE 301 and indicates the approval to UE 301. Once registered on network circuitry 330, UE 301 exchanges IMS registration signaling with IMS circuitry 340 over source RAN 310 and network circuitry 330. IMS circuitry 340 confirms the identify of UE 301 and determines UE 301 is authorized for IMS service. IMS circuitry 340 approves the IMS registration of UE 301 and indicates the approval to UE 301.

UE 301 initiates a voice call with UE 350. UE 301 transfers a Mobile Originating Session Initiation Protocol (MO SIP) invite for UE 350 to source RAN 310. RAN 310 delivers the SIP invite to IMS circuitry 340 over network circuitry 330. IMS circuitry 340 routes the MO SIP invite to UE 350. UE 350 accepts the call and IMS 340 routes the acceptance to UE 301 and organizes the end-to-end links to support the call. UE 301 wirelessly exchanges voice data with source RAN 310. Source RAN 310 exchanges voice data with network circuitry 330 which exchanges voice data with IMS circuitry 340. IMS circuitry 340 routes the voice data between network circuitry 330 and UE 350.

During the voice, UE 301 moves around and measures RSRP for source RAN 310 and target RAN 320. UE 301 generates a measurement report that comprises the RSRP for RANs 310 and 320 and wirelessly transfers the report to source RAN 310. Source RAN 310 applies the RSRPs to a handover threshold to detect handover conditions. Source RAN 310 transfers a handover command (HO COMMAND) to UE 301 and target RAN 320. In response, UE 301 detaches from source RAN 310 and exchanges attachment signaling with target RAN 320. Before the connection with target RAN 320 is established, UE 301 sets a handover timer to detect when to generate comfort noise. In this example, time out occurs before handover is complete and UE 301 responsively generates comfort noise for the user. Subsequently, UE 301 successfully attaches to target RAN 320 and the voice call resumes. Target RAN 320 wirelessly delivers voice data to UE 301. UE 301 detects the voice packets and stops generating comfort noise for the user.

Figure 5:
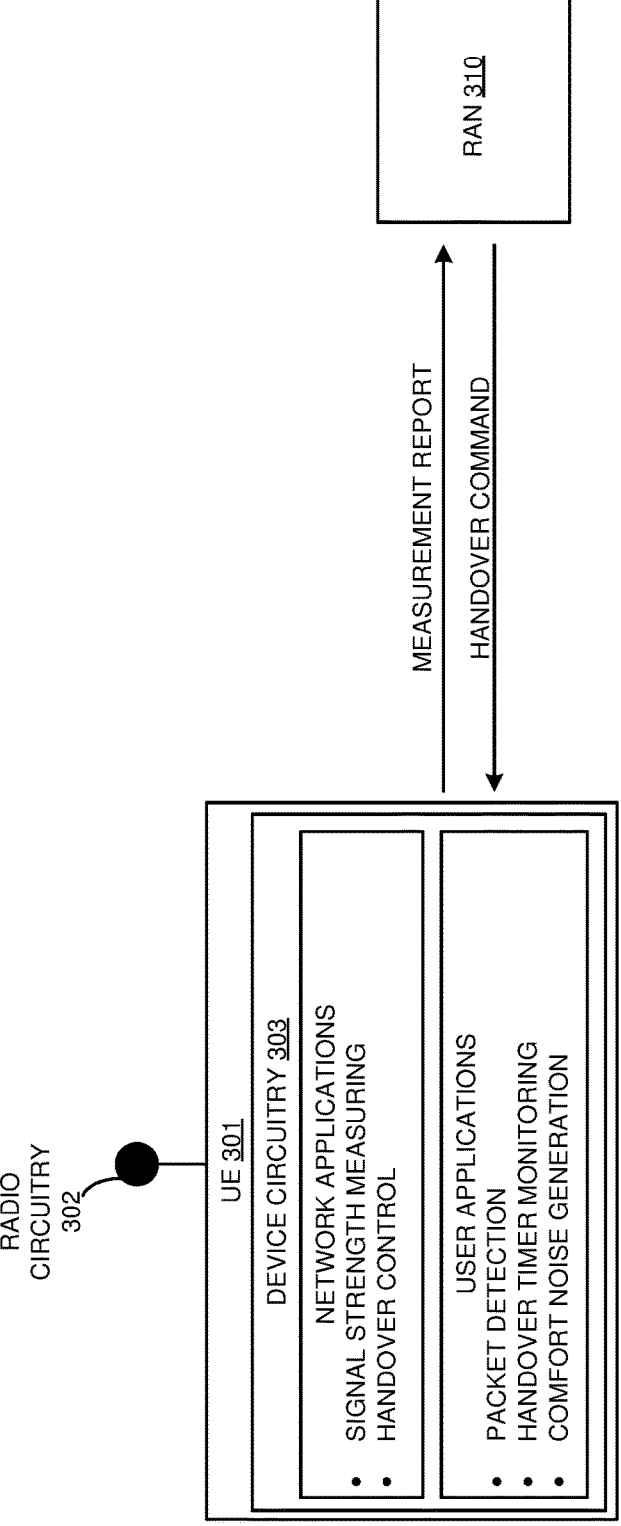
FIG. 5 further illustrates the wireless communication network to induce comfort noise in the wireless UE during handover.

FIG. 5 further illustrates UE 301 and RAN 310 in wireless communication network 300. Device circuitry 303 in UE 301 hosts network applications and user applications. The network applications handle signaling and data exchange with network circuitry 330 over RAN 310. The user applications generate, and transfer user data as specified by the network applications. Exemplary network applications include Radio Resource Control, Service Data Adaption Protocol (SDAP), Packet Data Convergence Protocol (PDCP), Radio Link Control (RLC), Media Access Control (MAC), and Physical Layer (PHY). Exemplary user applications include voice calling applications, video calling applications, and text messaging applications. During voice calls, the network applications control radio circuitry 302 to measure signal strength for RANs 310 and 320 at the location of UE 301. The network applications generate a measurement report based on the signal strength measurements and control radio circuitry 302 to transfer the measurement report to RAN 310.

Radio circuitry 302 wirelessly receives handover command from RAN 310 and delivers the command to the network applications. The network applications generate attachment signaling for target RAN 320 based on the handover command and direct the user applications to set a handover timer to determine when to generate comfort noise. The user applications set the timer and listen for downlink packets from RAN 320. If the user applications detect downlink packets for the voice call before the timer has expired, the user applications deactivate the timer. If the timer expires before the user applications detect downlink packets, the user applications generate comfort noise packets and deliver the comfort noise to the user. The comfort noise maintains the user experience during handover. The user applications stop generating comfort noise when they detect downlink voice packets.

Figure 6:
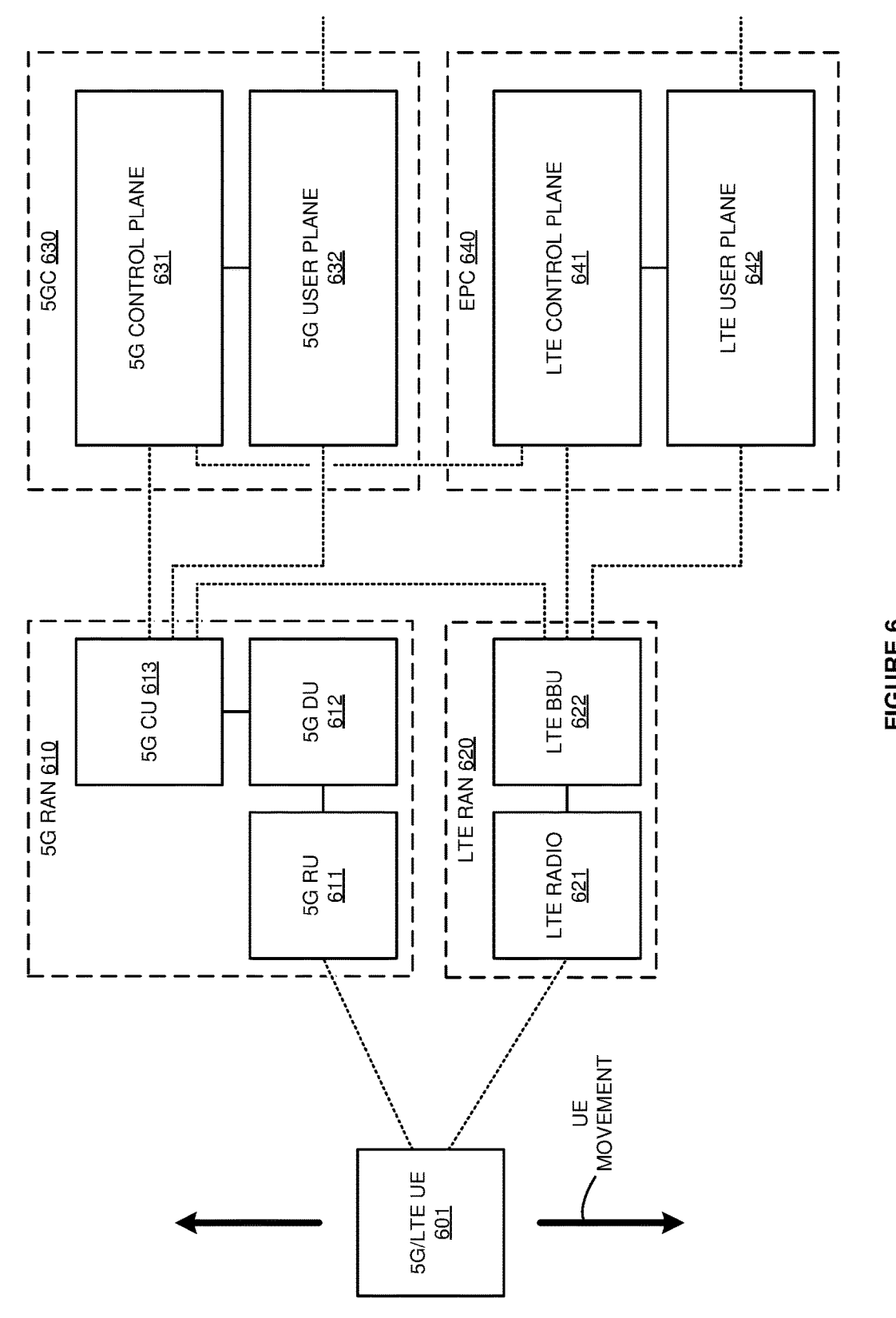
FIG. 6 illustrates a Fifth Generation (5G) wireless communication network to induce comfort noise in a 5G/Long Term Evolution (LTE) UE during handover.

FIG. 6 illustrates 5G communication network 600 to induce comfort noise in a 5G/LTE UE during handover. 5G communication network 600 comprises an example of wireless communication networks 100 and 300, although networks 100 and 300 may differ. 5G communication network 600 comprises 5G/LTE UE 601, 5G RAN 610, LTE RAN

620, Fifth Generation Core (5GC) 630, and Evolved Packet Core (EPC) 640. 5G RAN 610 comprises 5G Radio Unit (RU) 611, 5G Distribute Unit (DU) 612, and 5G Centralized Unit (CU) 613. LTE RAN 620 comprises LTE radio 621 and LTE Baseband Unit (BBU) 622. 5GC 630 comprise 5G control plane 631 and 5G user plane 632. EPC 640 comprises LTE control plane 641 and LTE user plane 642. 5G control plane 631 comprises 5GC network functions and network entities like Access and Mobility Management Function (AMF), Session Management Function (SMF), Authentication Server Function (AUSF), Network Slice Selection Function (NSSF), Policy Control Function (PCF), Network Repository Function (NRF), Network Exposure Function (NEF), Application Function (AF), and Unified Data Management (UDM). 5G user plane 632 comprises 5GC network functions and network entities like User Plane Function (UPF). LTE control plane 641 comprises EPC network functions and network entities like Mobility Management Entity (MME), Access Network Discovery and Selection Function (ANDSF), Policy and Charging Rules Function (PCRF), and Home Subscriber Server (HSS). LTE user plane 642 comprises EPC network functions and network entities like Serving Gateway (SGW) and Packet Data Network Gateway (PGW). In other examples, wireless network communication network 600 may comprise additional or different elements than those illustrated in FIG. 6.

UE 601 wirelessly attaches to CU 613 via DU 612 and RU 611. UE 601 exchanges attachment signaling with CU 613 to establish a connection with 5G network applications hosted by CU 613. UE 601 transfers a registration request that indicates a registration type, UE capabilities, requested slice types, IMS registration requests, and Protocol Data Unit (PDU) session requests to 5G control plane 631 over RAN 610. The 5GC network functions that comprise 5G control plane 631 interact to authenticate and authorize UE 601 for wireless data service and IMS multimedia services like voice calling and text messaging. Responsive to the authentication and authorization, 5G control plane 631 generates UE context to establish the wireless data service. The UE context comprises metrics like Quality-of-Service (QOS), slice Identifiers (IDs), service attributes, network addresses, IMS network addresses, and the like. Control plane 631 transfers the UE context to UE 601 over 5G RAN 610.

UE 601 receives the UE context and uses the network addresses to initiate a voice call. UE 601 generates an MO SIP invite for a terminating UE (not illustrated for clarity) and wirelessly transfers the MO SIP invite to 5G CU 613 over RU 611 and DU 612. CU 613 forwards the SIP invite to 5G user plane 632. User plane 632 interfaces with an IMS (not illustrated for clarity) to deliver the MO SIP invite to the terminating UE and to establish the end-to-end connection between UE 601 and the terminating UE to support the voice call. For example, the IMS may organize Real-Tome Transport Protocol (RTP) links to set up the end-to-end connection between UE 601 and the terminating UE. The terminating UE accepts the voice call and 5G user plane receives a SIP accept message generated by the terminating UE via the IMS. 5G user plane 632 transfers the accept message to UE 601 via RAN 610. The SIP accept message includes information like IP addresses to inform UE 601 where to send voice packets for the call. When the terminating UE answers the call, the voice session begins and UE 601 exchanges with CU 613 over RAN 611 and DU 612. CU 613 exchanges the voice packets with 5G user plane 632. 5G user plane 632 exchanges the voice packets for delivery to the terminating UE over one or more intermediary systems like IMS, other user planes, transport networks, and other RANs. A portion of the packets exchanged during the voice session between UE 601 and the terminating UE comprise comfort noise packets. The comfort noise packets are used to create synthetic background noise which can be played by UE 601 to improve the user experience. 5G user plane 632 generates the comfort noise packets and inserts the comfort noise packets in the voice packet flow for delivery to UE 601. For example, 5G user plane 632 may insert the comfort packets every into the voice packet flow every 160 ms. UE 601 wirelessly receives the comfort noise packets and generates the comfort noise for the user. UE 601 also maintains a copy of one or more of the comfort noise packets which UE 601 can use to organically generate comfort noise packets during break-before-make handover without requiring an active network connection. By storing the received comfort noise packets, UE 601 can maintain comfort noise continuity.

As UE 601 moves around during the voice call, the received signal strength from RANs 610 and 620 varies. The variance in received signal strength may force UE to handover from 5G RAN 610 to LTE RAN 620. 5G DU 612 generates Channel State Information (CSI) resource blocks and Synchronization Signal (SS) resource blocks. 5G RAN 610 broadcasts the CSI resource blocks and SS resource blocks over RU 611. Concurrently, LTE BBU 612 generates Cell Specific Reference Signal (CRS) resource blocks. LTE RAN 620 broadcasts the CRS resource blocks over LTE radio 621.

UE 601 wirelessly receives the CSI and SS resource blocks from 5G RAN 610 and wirelessly receives the CRS resource blocks from LTE RAN 620. UE 601 synchronizes with 5G RAN 610 using the SS resource blocks and measures the RSRP of the CSI blocks to determine the received signal strength of 5G RAN 610. UE 601 measures the RSRP of the CRS resource blocks to determine the received signal strength of LTE RAN 620. UE 601 generates a measurement report that comprises the measured RSRP for 5G RAN 610 and the measured RSRP for LTE RAN 620. UE 601 wirelessly transfers the measurement report to CU 613 over RU 611 and DU 612.

CU 613 reads the measurement report to determine the 5G RSRP for RAN 610 and the LTE RSRP for RAN 620. For inter-Radio Access Technology (RAT) handover, CU 613 compares the 5GNR RSRP and the LTE RSRP to a B2 and/or to a B1 handover threshold. The B1 threshold and B2 threshold are defined as:

$$M_n + O - Hys > TH \qquad \text{B1 Threshold}$$

$$M_p + Hys < TH_1 \ \& \ M_n + O - Hys > TH_2 \qquad \text{B2 Threshold}$$

For the B1 threshold, $M_n$ is the neighbor cell signal strength, O is the frequency offset, Hys is the hysteresis value, and TH is the threshold value. For the B2 threshold, $M_p$ is the serving cell signal strength, $M_n$ is the neighbor cell signal strength, O is the frequency offset, Hys is the hysteresis value. $TH_1$ is the serving threshold value, and $TH_2$ is the neighbor threshold value. The offset parameters can be understood as the frequency difference between the serving and neighbor cells. The hysteresis parameter can be understood as a buffer value to inhibit ping pong behavior (i.e., repetitive handover) by the UE.

When the B1 threshold is used to govern inter-RAT handover, CU 613 sums the LTE RSRP, offset value for LTE RAN, and hysteresis and compares this value to the B1 threshold value. When the sum exceeds the B1 threshold value, CU 613 generates a handover command for UE 601 to handover to LTE RAN 620. When the sum does not exceed the B1 threshold value, CU 613 does not generate the handover command for UE 601.

When the B2 threshold is used to govern inter-RAN handover, CU 613 sums the 5GNR RSRP and hysteresis value and compares this sum to the first B2 threshold value. CU 613 sums the LTE RSRP, the offset, and the hysteresis value and compares this sum to the second B2 threshold value. When the first B2 sum does not exceed the first B2 threshold and when the second B2 sum exceeds the second B2 threshold value, CU 613 generates a handover command for UE 601 to handover to LTE RAN 620. When the first B2 sum exceeds the first B2 threshold and/or the second B2 sum does not exceed the second B2 threshold value, CU 613 does not generate a handover command for UE 601.

In the examples where the B1 and/or B2 threshold are triggered, CU 613 transfers a handover command to UE 601 over DU 612 and RU 611. CU 613 directs LTE BBU 622 to serve UE 601 over their X2 interface. CU 613 notifies 5G control plane 631 of the handover requirement. 5G control plane 631 interfaces with LTE control plane 641 to handover UE 601 to LTE RAN 620 and with the IMS to route voice packets to EPC 640. LTE control plane 641 receives the direction from 5G control plane 631 and controls LTE user plane 642 to establish the data links UE 601's voice call through LTE RAN 620. In some examples, 5G RAN 610 lacks a direct connection (e.g., an X2 interface) with LTE RAN 620. In such examples, 5G RAN 610 and LTE RAN 620 may exchange handover/addition signaling indirectly through control planes 631 and 641.

Concurrent to the control plane signaling, UE 601 receives the handover command and detaches from 5GNR RAN 610 before attaching to LTE RAN 620. During period of time after UE 601 has detached from 5G RAN 610 and before UE 601 has established a data link with LTE RAN 620, UE 601 is unable to receive downlink voice packets generated by the terminating UE or wirelessly transfer uplink voice packets addressed to the terminating UE. In response to the handover command, UE 601 sets a handover timer to govern when to generate comfort noise and exchanges attachment signaling with LTE BBU 622 over LTE radio 621 to reestablish a wireless connection. UE 601 monitors for downlink packets sent from LTE RAN 620. In this example, the handover timer expires before UE 601 and LTE RAN 620 establish a wireless data connection. In response to the timer expiration, UE 601 retrieves the stored comfort noise packet(s) from memory. UE 601 generates organic comfort noise packets based on the stored comfort noise packets. UE 601 plays the organically generated comfort noise for the user.

Subsequently, UE 601 successfully attaches to LTE BBU 622 over LTE radio 621. BBU 622 interfaces with LTE control plane 641 to authenticate and authorize UE 601 on EPC 640. Responsive to authentication and authorization, LTE control plane 641 transfers UE context to UE 601 over LTE RAN 620. UE 601 utilizes the UE context to maintain the voice call over EPC 640. UE 601 exchanges voice data with LTE user plane 642 over RAN 620. LTE control plane 642 exchanges the voice data for delivery to the terminating UE. UE 601 detects the downlink voice packets generated by the terminating UE and sent over LTE RAN 620. In response to detecting the downlink packets, UE 601 stops generating comfort noise packets.

Although the above examples are presented in the context where UE 601 initially attaches to 5G RAN 610, these examples also apply to situations where UE 601 initially attaches to LTE RAN 620. Moreover, although the above examples are given in the context of RSRP, CU 613 and BBU 622 may use other types of signal strength/quality metrics like Received Signal Strength Indication (RSSI), Reference Signal Received Quality (RSRQ), and the like to detect handover conditions. These additional metrics may be used in place of or in addition to RSRP when detecting handing over. Although UE 601 is presented as the calling UE in the above examples, it should be appreciated that the above teachings also apply when UE 601 receives voice calls.

Figure 7:
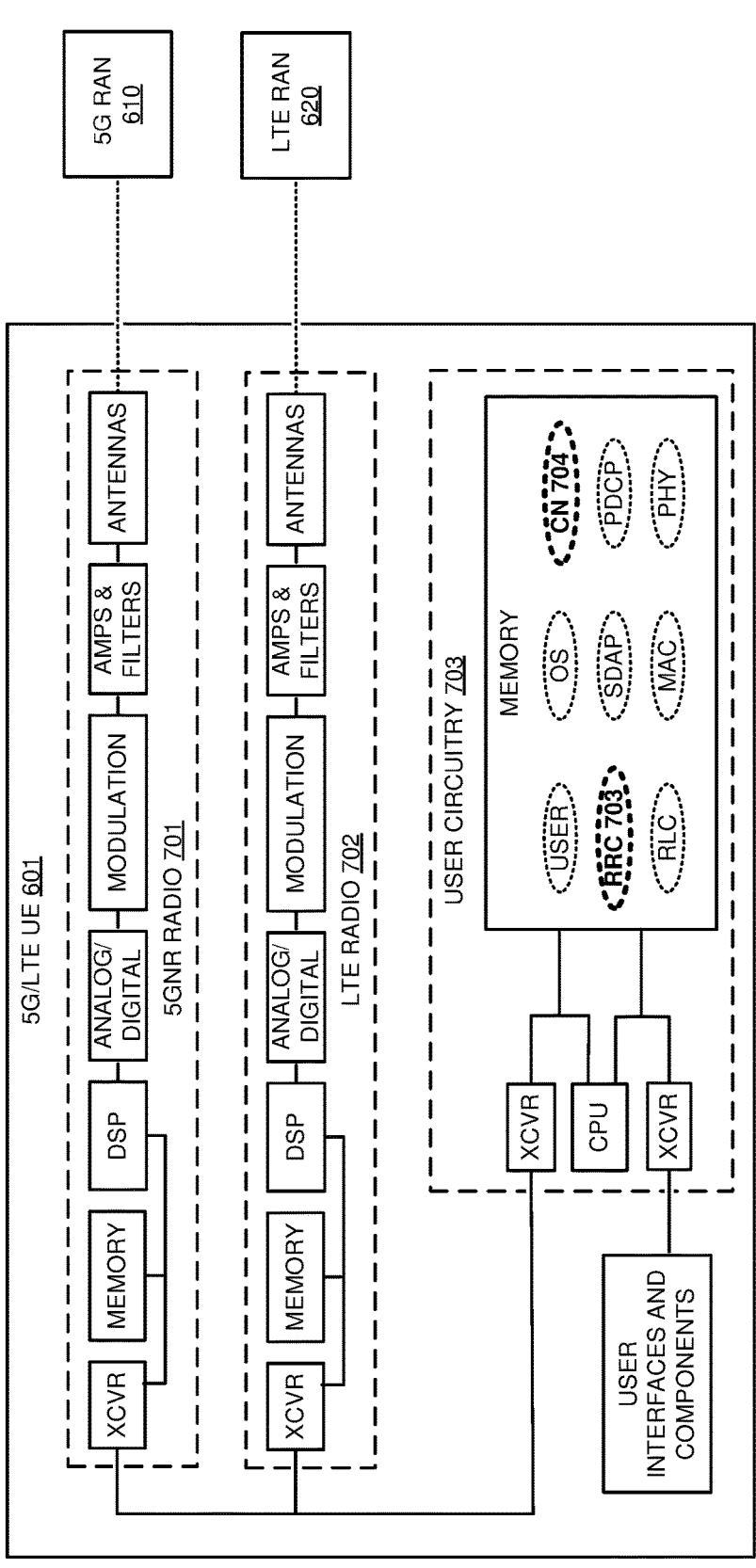
FIG. 7 illustrates a 5G/LTE UE in the 5G communication network.

FIG. 7 illustrates 5G/LTE UE 601 in 5G communication network 600. UE 601 comprises an example of user device 101 illustrated in FIG. 1 and UE 301 illustrated in FIG. 3, however user device 101 and UE 301 may differ. UE 601 comprises 5G radio 701, LTE radio 702, and user circuitry 703. 5GNR Radio 701 comprises antennas, amplifiers, filters, modulation, analog-to-digital interfaces, Digital Signal Processers (DSP), memory, and transceivers (XCVRs) that are coupled over bus circuitry. LTE Radio 702 comprises antennas, amplifiers, filters, modulation, analog-to-digital interfaces, Digital Signal Processers (DSP), memory, and transceivers (XCVRs) that are coupled over bus circuitry. User circuitry 703 comprises memory, CPU, user interfaces and components, and transceivers that are coupled over bus circuitry. The memory in user circuitry 703 stores an operating system (OS), user applications (USER), Comfort Noise Application (CN) 704, 5GNR network applications for Physical Layer (PHY), Media Access Control (MAC), Radio Link Control (RLC), Packet Data Convergence Protocol (PDCP), Service Data Adaptation Protocol (SDAP), and Radio Resource Control (RRC) 704, and LTE network applications for PHY, MAC, RLC, and PDCP. The corresponding LTE and 5GNR network applications (e.g., 5GNR PHY and LTE PHY) have been combined in FIG. 7 for sake of clarity. The antenna in radio 701 is wirelessly coupled to 5G RAN 610 over a 5GNR link. The antenna in LTE radio 702 is wirelessly coupled to LTE RAN 620 over an LTE link. Transceivers in radios 701 and 702 are coupled to a transceiver in user circuitry 703. A transceiver in user circuitry 703 is typically coupled to the user interfaces and components like displays, controllers, and memory.

In radio 701, the antennas receive wireless signals from 5G RAN 610 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 703 over the transceivers. In user circuitry 703, the CPU executes the 5GNR network applications to process the 5GNR symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 701, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RAN 610 that transport the uplink 5GNR signaling and data.

In radio 702, the antennas receive wireless signals from LTE RAN 620 that transport downlink LTE signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding LTE symbols to user circuitry 703 over the transceivers. In user circuitry 703, the CPU executes the LTE network applications to process the LTE symbols and recover the downlink LTE signaling and data. The LTE network applications receive new uplink signaling and data from the user applications. The network applications process the uplink user signaling and the downlink LTE signaling to generate new downlink user signaling and new uplink LTE signaling. The network applications transfer the new downlink user signaling and data to the user applications. The LTE network applications process the new uplink LTE signaling and user data to generate corresponding uplink LTE symbols that carry the uplink LTE signaling and data.

In radio 702, the DSP processes the uplink LTE symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless LTE signals to LTE RAN 620 that transport the uplink LTE signaling and data.

RRC 703 functions comprise authentication, security, handover control, status reporting, QoS, network broadcasts and pages, and network selection. CN 704 functions comprise downlink voice packet monitoring during handover, setting/monitoring handover timers, caching network comfort noise packets, and generating organic comfort noise packets. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, QoS. PHY functions comprise packet formation/deformation, windowing/de-windowing, guard-insertion/guard-deletion, parsing/de-parsing, control insertion/removal, interleaving/de-interleaving. Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In some examples, RRC 703 generates measurement reports characterizing the RSRP for 5G RAN 610 and LTE RAN 620. RRC 703 controls the lower layer 5GNR network applications like 5GNR PHY to measure 5GNR RSRP for CSI resource blocks received from 5G RAN 610. RRC 703 controls the lower layer LTE network applications like LTE PHY to measure LTE RSRP for CRS resource blocks received from LTE RAN 620. RRC 703 generates a measurement report comprising the 5GNR RSRP and the LTE RSRP. RRC 703 controls the lower layer network functions to transfer the measurement report to 5G RAN 610 and/or LTE RAN 620 depending on the connection status of UE 601.

When RRC 703 receives a handover command for 5G RAN 610 or LTE RAN 620 to handover, RRC 703 generates attachment for the target access node indicated in the handover command and controls the lower layer network applications to deliver the attachment signaling to the handover target. In response to the handover command and the existence of an active voice session involving UE 601, RRC 703 directs CN 704 to set a handover timer to determine when to generate comfort noise. CN 704 monitors for downlink voice packets and tracks the progress of the timer. If CN 704 detects a downlink packet or the transmission of an uplink packet before the timer expires (which indicates handover is complete), CN 704 deactivates the handover timer. If the timer expires before CN 704 detects voice packet reception or transfer (indicating handover is still in progress), CN 704 retrieves a cached network generated comfort noise packet received from the network earlier in the voice call. CN 704 generates comfort noise packets based on the network generated comfort noise packets to maintain comfort noise continuity. CN 704 transfers the comfort noise packets to the user interfaces and components which generate audio based on the comfort noise packets. The user interfaces and components play the comfort noise for the user.

When UE 601 successfully attaches to the target access node, UE 601 resumes exchanging voice packets for the voice call. CN 704 detects the exchange of voice packets and responsively ceases generating comfort noise. Alternatively, RRC 703 may receive network signaling from the target access node indicating successful handover and RRC 703 may direct CN 704 to stop generating comfort noise.

Figure 8:
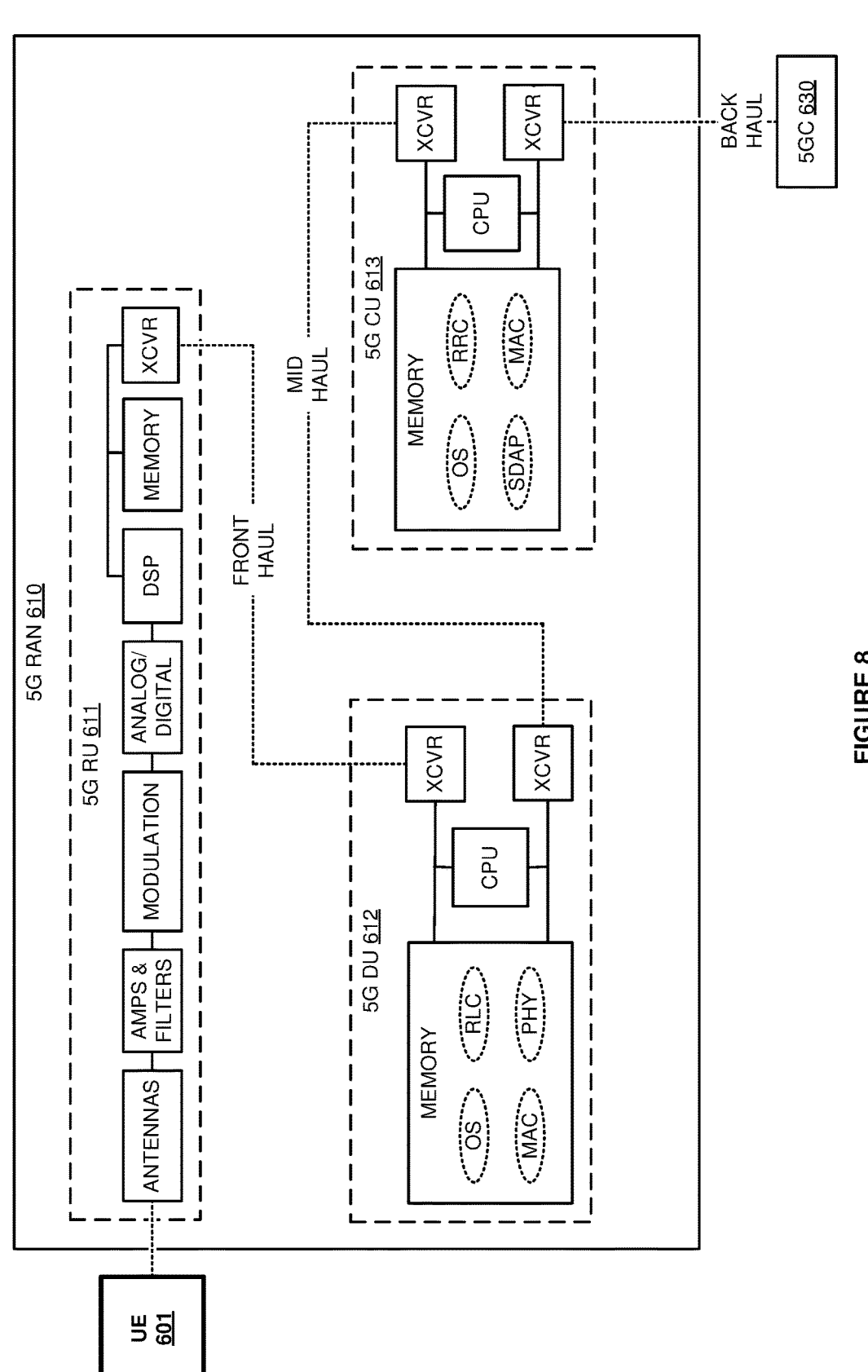
FIG. 8 illustrates a 5G Radio Access Network (RAN) in the 5G wireless communication network.

FIG. 8 illustrates 5G RU 611, 5G DU 612, and 5G CU 613 in 5G communication network 600. RU 611, DU 612, and CU 613 comprise an example of nodes 111 and 112 illustrated in FIG. 1 and RANs 310 and 320 illustrated in FIG. 3, however access nodes 111 and 112 and RANs 310 and 320 may differ. RU 611 comprises antennas, amplifiers, filters, modulation, analog-to-digital interfaces, DSP, memory, and transceivers (XCVRs) that are coupled over bus circuitry. UE 601 is wirelessly coupled to the antennas in RU 611 over 5GNR links. Transceivers in 5G RU 611 are coupled to transceivers in 5G DU 612 over fronthaul links like enhanced Common Public Radio Interface (eCPRI). The DSPs in RU 611 executes their operating systems and radio applications to exchange 5GNR signals with UE 601 and to exchange 5GNR data with DU 612.

For the uplink, the antennas receive wireless signals from UE 601 that transport uplink 5GNR signaling and data. The antennas transfer corresponding electrical signals through duplexers to the amplifiers. The amplifiers boost the received signals for filters which attenuate unwanted energy.

Demodulators down-convert the amplified signals from their carrier frequencies. The analog/digital interfaces convert the demodulated analog signals into digital signals for the DSPs. The DSPs transfer corresponding 5GNR symbols to DU 612 over the transceivers.

For the downlink, the DSPs receive downlink 5GNR symbols from DU 612. The DSPs process the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink 5GNR signaling and data.

DU 612 comprises memory, CPU, and transceivers that are coupled over bus circuitry. The memory in 5G DU 612 stores operating systems and 5GNR network applications like PHY, MAC, and RLC. CU 613 comprises memory, CPU, and transceivers that are coupled over bus circuitry. The memory in CU 613 stores an operating system and 5GNR network applications like PDCP, SDAP, and RRC. Transceivers in 5G DU 612 are coupled to transceivers in RU 611 over front-haul links. Transceivers in DU 612 are coupled to transceivers in CU 613 over mid-haul links. A transceiver in CU 613 is coupled to 5GC 630 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

In some examples, the RRC in CU 613 receives a measurement report generated by UE 601. The measurement report comprises a 5GNR RSRP for 5GNR RAN 610 and an LTE RSRP for LTE RAN 620. The RRC may use the 5GNR RSRP and LTE RSRP in B2 measurement events to determine when to handover UE 601 from 5GNR RAN 610 to LTE RAN 620. The RRC may use the LTE RSRP in B1 measurement events to determine when to handover UE 601 from 5GNR RAN 610 to LTE RAN 620. In response to determining handover is required (e.g., B1 and/or B2 threshold is triggered), the RRC in CU 613 generates a handover command directing UE 601 to handover to LTE RAN 620 and controls the lower layer network applications like PDCP, RLC, MAC, and PHY to wirelessly transfer the handover command to UE 601 over RU 611. The RRC in CU 613 interfaces with LTE RAN 620 over X2 links or through core network interfaces to direct RAN 620 to serve UE 601. The RRC in CU 613 transfers a handover required message to 5G control plane 631 to notify 5GC 630 of the handover.

Figure 9:
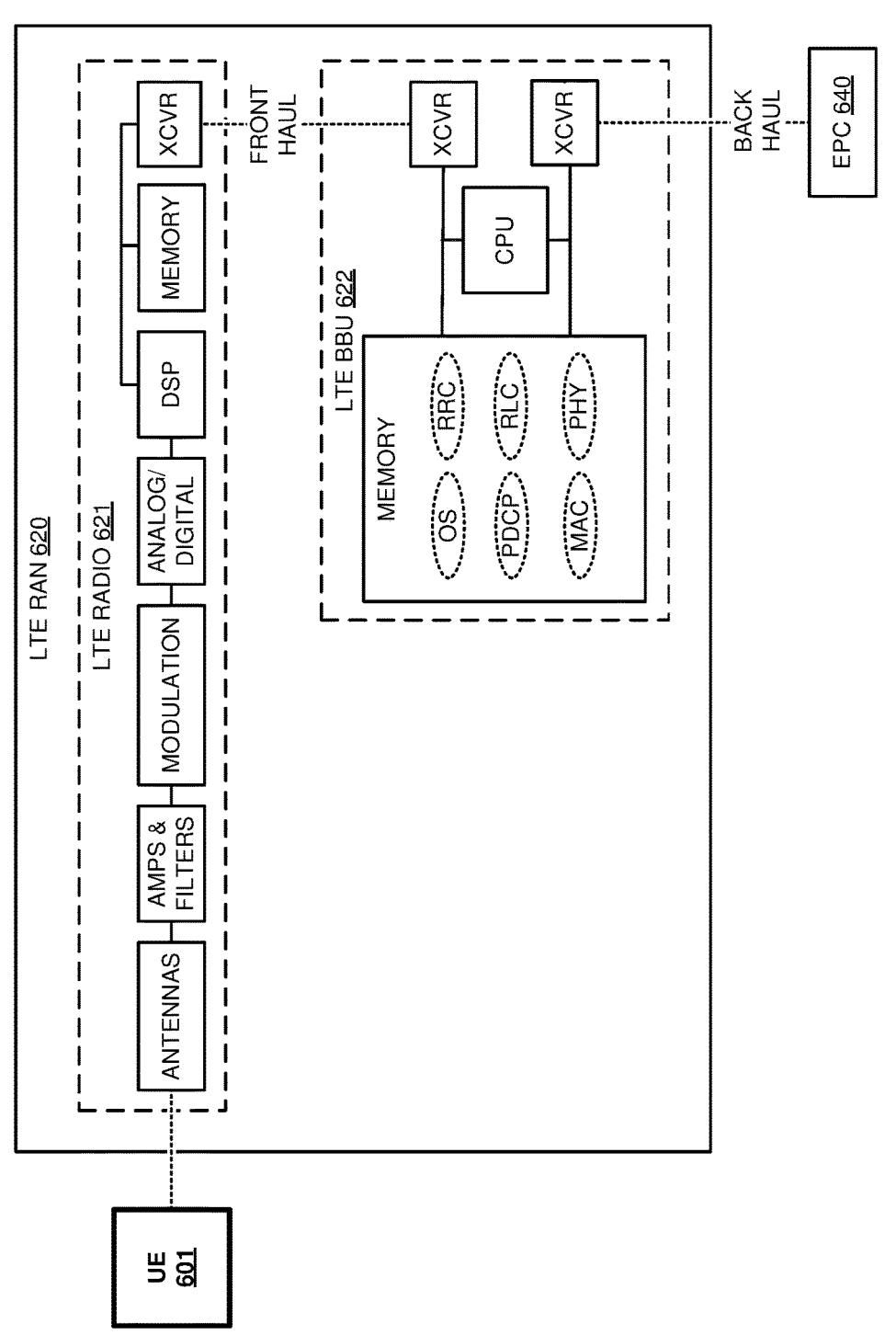
FIG. 9 illustrates an LTE RAN in the 5G wireless communication network.

FIG. 9 illustrates LTE radio 621 and LTE BBU 622 in 5G communication network 600. LTE radio 621 and LTE BBU 622 comprise an example of nodes 111 and 112 illustrated in FIG. 1 and RANs 310 and 320 illustrated in FIG. 3, however access nodes 111 and 112 and RANs 310 and 320 may differ.

LTE radio 621 comprises antennas, amplifiers, filters, modulation, analog-to-digital interfaces, DSP, memory, and transceivers (XCVRs) that are coupled over bus circuitry. UE 601 is wirelessly coupled to the antennas in LTE radio 621 over LTE links. Transceivers in LTE radio 621 are coupled to transceivers in LTE BBU 622 over fronthaul links like enhanced Common Public Radio Interface (eCPRI). The DSPs in LTE radio 621 execute their operating systems and radio applications to exchange LTE signals with UE 601 and to exchange LTE data with BBU 622.

For the uplink, the antennas receive wireless signals from UE 601 that transport uplink LTE signaling and data. The antennas transfer corresponding electrical signals through duplexers to the amplifiers. The amplifiers boost the received signals for filters which attenuate unwanted energy. Demodulators down-convert the amplified signals from their carrier frequencies. The analog/digital interfaces convert the demodulated analog signals into digital signals for the DSPs. The DSPs transfer corresponding LTE symbols to BBU 622 over the transceivers.

For the downlink, the DSPs receive downlink LTE symbols from BBU 622. The DSPs process the downlink LTE symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to UE 601 that transport the downlink LTE signaling and data.

LTE BBU 622 comprises memory, CPU, and transceivers that are coupled over bus circuitry. The memory in BBU 622 stores operating systems and LTE network applications like PHY, MAC, RLC, PDCP, and RRC. Transceivers in BBU 622 are coupled to transceivers in LTE radio 621 over front-haul links. A transceiver in BBU 622 is coupled to EPC 640 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

In some examples, the RRC in BBU 622 receives a measurement report generated by UE 601. The measurement report comprises a 5GNR RSRP for 5GNR RAN 610 and an LTE RSRP for LTE RAN 620. The RRC may use the 5GNR RSRP and LTE RSRP in B2 measurement events to determine when to handover UE 601 from LTE RAN 620 to 5GNR RAN 610. The RRC may use the 5GNR RSRP in B1 measurement events to determine when to handover UE 601 from LTE RAN 620 to 5GNR RAN 610. In response to determining handover is required (e.g., B1 and/or B2 threshold is triggered), the RRC in BBU 622 generates a handover command directing UE 601 to handover to 5GNR RAN 610 and controls the lower layer network applications like PDCP, RLC, MAC, and PHY to wirelessly transfer the handover command to UE 601 over LTE radio 621. The RRC in BBU 622 interfaces with 5GNR RAN 610 over X2 links or through core network interfaces to direct RAN 610 to serve UE 601. The RRC in BBU 622 transfers a handover required message to LTE control plane 641 to notify EPC 640 of the handover.

Figure 10:
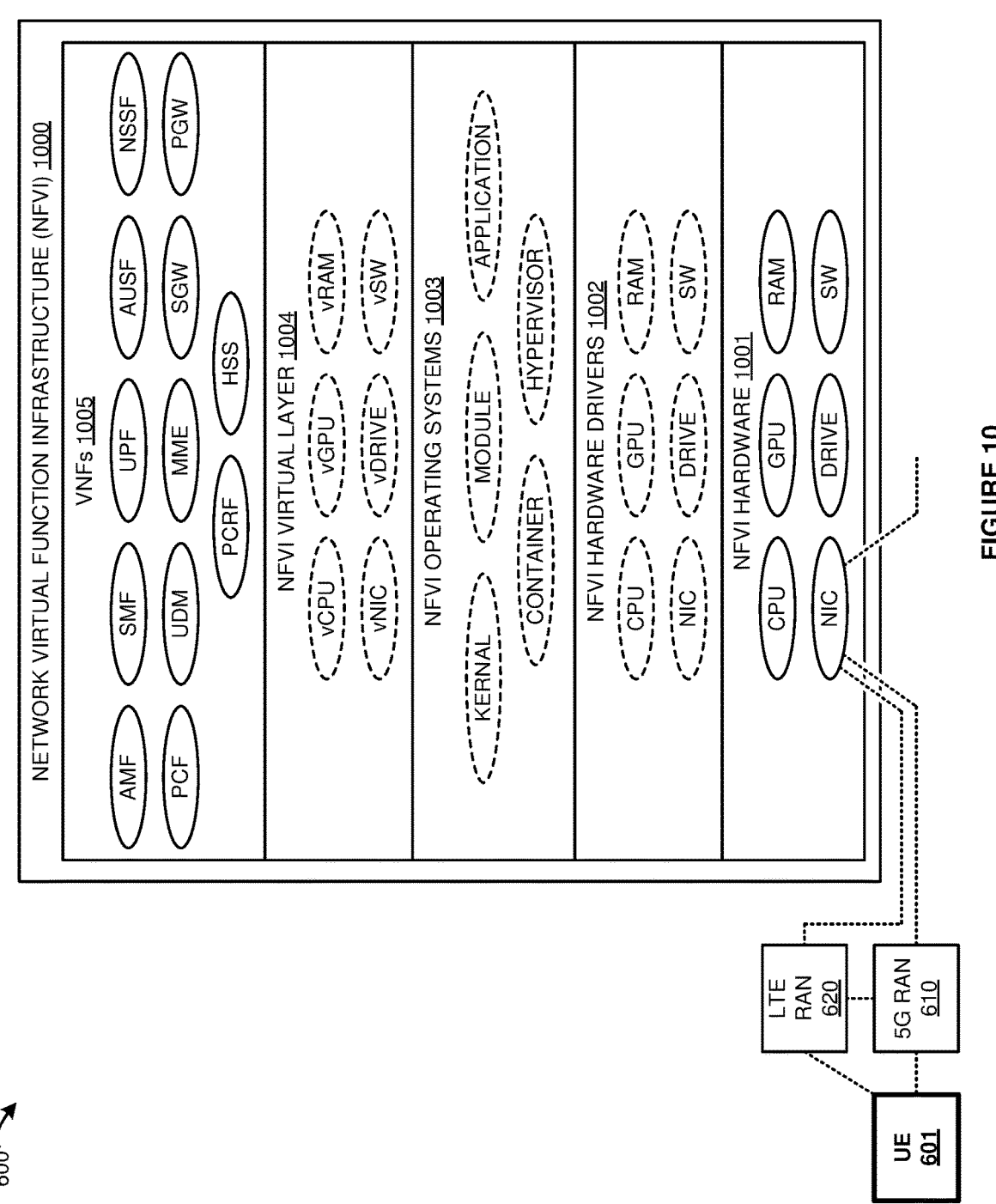
FIG. 10 illustrates a Network Function Virtualization Infrastructure (NFVI) in the 5G wireless communication network.

FIG. 10 illustrates Network Function Virtualization Infrastructure (NFVI) 1000. NFVI 1000 comprises an example of core network 121 and multimedia system 131 illustrated in FIG. 1 and network circuitry 330 and IMS circuitry 340 illustrated in FIG. 3, core network 121 and multimedia system 131 illustrated in FIG. 1 and network circuitry 330 and IMS circuitry 340 may differ. NFVI 1000 comprises NFVI hardware 1001, NFVI hardware drivers 1002, NFVI operating systems 1003, NFVI virtual layer 1004, and NFVI VNFs 1005. NFVI hardware 1001 comprises Network Interface Cards (NICs), CPU, GPU, RAM, Flash/Disk Drives (DRIVE), and Data Switches (SW). NFVI hardware drivers 1002 comprise software that is resident in the NIC, CPU, GPU, RAM, DRIVE, and SW. NFVI operating systems 1003 comprise kernels, modules, applications, containers, hypervisors, and the like. NFVI virtual layer 1004 comprises vNIC, vCPU, vGPU, vRAM, vDRIVE, and vSW. NFVI VNFs 1005 comprise AMF, SMF, UPF, AUSF, NSSF, PCF, UDM, MME, SGW, PGW, PCRF, and HSS. Additional VNFs and network elements like NRF, NEF, AF, and ANDSF are typically present but are omitted for clarity. The AMF, SMF, AUSF, NSSF, PCF, UDM compose 5G control plane 631. The UPF composes 5G user plane 632. The MME, PCRF, and HSS compose LTE control plane 641. The SGW and PGW compose LTE user plane 642. NFVI 900 may be located at a single site or be distributed across multiple geographic locations. For example, NFVI 900 may be split where one portion forms 5GC 630 and other portion forms EPC 640. The NIC in NFVI hardware 1001 is coupled to 5G RAN 610, LTE RAN 620, and to external systems like data networks and application servers. NFVI hardware 1001 executes NFVI hardware drivers 1002, NFVI operating systems 1003, NFVI virtual layer 1004, and NFVI VNFs 1005 to form 5G control plane 631, 5G user plane 632, LTE control plane 641, and LTE user plane 642.

In some examples, NFVI 1000 may support IMS functionality. For example, VNFs 1005 may comprise Call State Control Function (CSCF), Short Message Service Application Server (SMS AS), Telephony Application Server (TAS), and the like. NFVI hardware 1001 may execute NFVI hardware drivers 1002, NFVI operating systems 1003, NFVI virtual layer 1004, and NFVI VNFs 1005 to form the CSCF, the SMS AS, and the TAS to provide IMS services like voice calling support and SIP message routing. However, in other examples, the IMS may be formed using a different NFVI. In either case, the IMS network functions are omitted from FIG. 10 for clarity.

Figure 11:
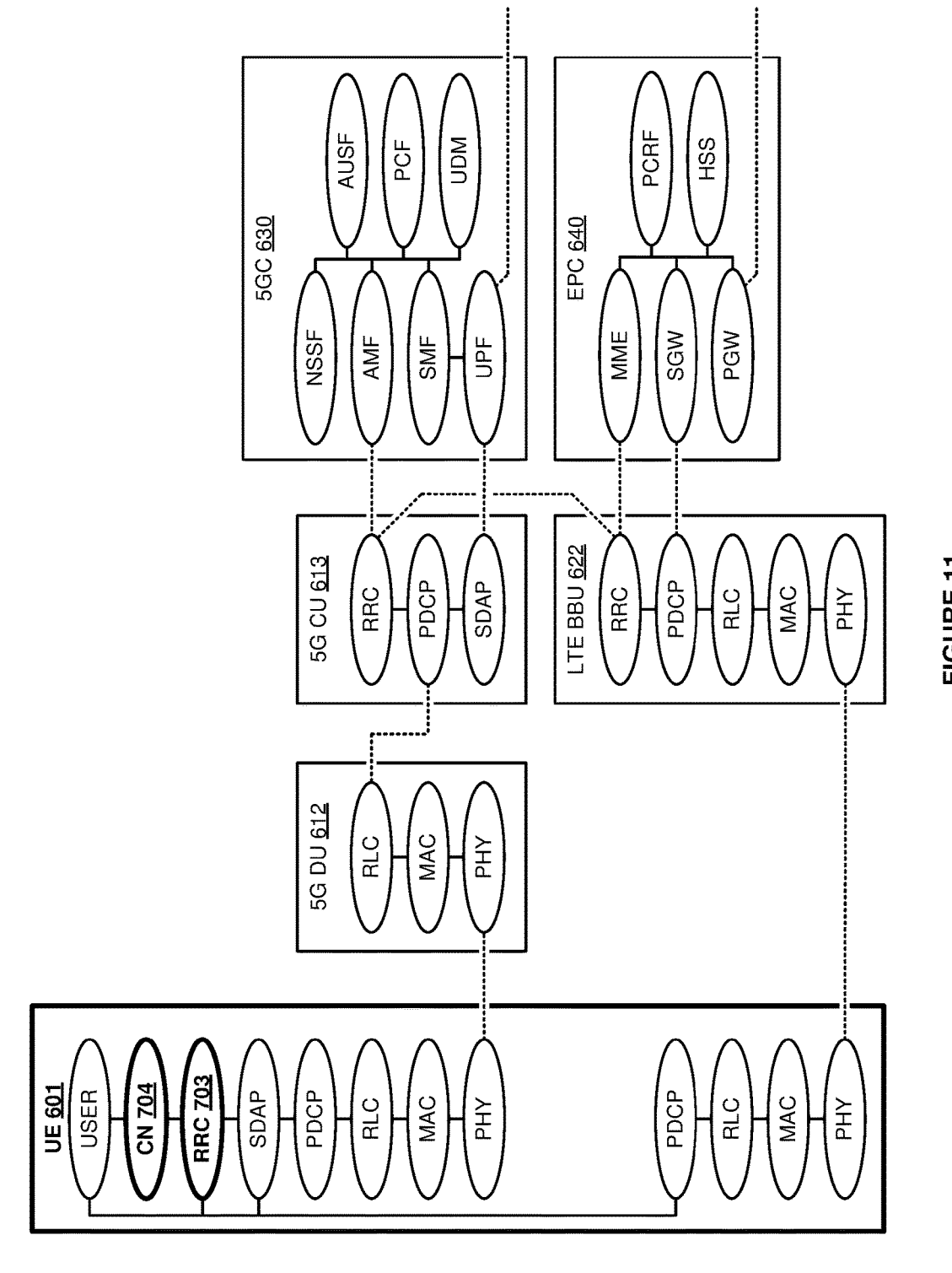
FIG. 11 illustrates an exemplary operation of the 5G wireless communication network to induce comfort noise in the 5G/LTE UE during handover.

FIG. 11 illustrates an exemplary operation of 5G communication network 600 to induce comfort noise in a 5G/LTE UE during handover. The operation may vary in other examples. In operation, UE 601 wirelessly attaches to LTE RAN 620. RRC 703 exchanges attachment signaling with the RRC in BBU 622 over the LTE PDCPs, RLCs, MACs, and PHYs to establish an RRC connection. RRC 703 transfers a registration request comprising a registration type, UE capabilities, requested slice types, PDU session requests, IMS registration requests, and the like. The UE capabilities indicate UE 601 comprises 5GNR dual connectivity capabilities. The RRC in BBU 622 transfers the registration request for UE 601 to the MME in EPC 640. The MME responds to the registration request by transferring an identity request for UE 601 to the RRC in BBU 622. The RRC in BBU 622 forwards the identity request to RRC 703 over the LTE PDCPs, RLCs, MACs, and PHYs. RRC 703 transfers an identity indication to the RRC in BBU 622 over the LTE PDCPs, RLCs, MACs, and PHYs. The RRC in CU 613 transfers the identity indication to the MME. The MME interacts with the other entities in EPC 640 to authenticate and authorize UE 601 for wireless data services.

Responsive to the authentication and authorization with EPC 640 and with IMS, the MME generates UE context comprising QoS metrics, slice IDs, service attributes, network addresses, and the like. The MME transfers the UE context to the RRC in BBU 622. The RRC in BBU 622 transfers the UE context to RRC 703 over the LTE PDCPs, RLCs, MACs, and PHYs. In response to the execution of the user application, RRC 703 uses the UE context to initiate a voice call over LTE RAN 620 and EPC 640. RRC 703 generates an MO SIP invite for a terminating UE (not illustrated) and transfers the MO SIP invite to the RRC in BBU 622 over the PDCPs, RLCs, MACs, and PHYs. The RRC in BBU 622 forwards the SIP invite to the PGW in EPC 640 over the SGW. The PGW transfers the SIP invite to the IMS (not illustrated) which delivers the SIP invite to the terminating UE. In response to the terminating UE accepting the call, the voice session begins. The user application generates voice data. The LTE PDCP in UE 601 exchanges the user data with the PDCP in BBU 622 over the LTE RLCs, MACs, and PHYs. The PDCP in BBU 622 exchanges the voice data with the SGW and PGW in EPC 640. The SGW and PGW route the voice data for delivery to the terminating UE.

During the voice call, the SGW and PGW periodically insert comfort noise packets into the voice data stream. For example, the SGW and PGW may insert a comfort noise packet into the voice stream at an interval of 160 ms. The SGW and PGW transfer the voice data including the comfort noise packets to the PDCP in LTE BBU 622. The PDCP in LTE BBU 622 transfers the voice data including the comfort noise packets to the PDCP in UE 601 over the LTE RLCs, MACs, and PHYs. CN 704 detects the network generated comfort noise packets and caches one or more of the packets in memory.

As UE 601 moves around, the received signal strengths for 5G RAN 610 and LTE RAN 620 vary. To detect handover conditions, the RRC in BBU 622 controls the MAC in BBU 622 to continuously generate CRS resource blocks. The MAC in BBU 622 broadcasts the CRS resource blocks over the PHY. Likewise, the RRC in CU 613 controls the MAC in DU 612 to periodically generate CSI and SS resource blocks. The MAC in DU 612 broadcasts the CSI and SS resource blocks over the PHY. RRC 703 receives the CRS resource blocks over the LTE PDCPs, RLCs, MACs, and PHYs and receives the CSI and SS resource blocks over the 5GNR PDCPs, RLCs, MACs, and PHYs. RRC 703 controls the LTE PHY to measure LTE RSRP based on CSR resource blocks to determine received signal strength for LTE RAN 620. RRC 703 controls the 5GNR PHY to synchronize with 5G RAN 610 using the SS resource blocks and measure 5GNR RSRP based on the CSI resource blocks to determine received signal strength for 5GNR RAN 610. RRC 703 generates a measurement report comprising 5GNR RSRP and the LTE RSRP and transfers the measurement report over the LTE PDCPs RLCs, MACs, and PHYS to the RRC in BBU 622.

The RRC in BBU 622 reads the measurement report and compares the 5GNR RSRP and LTE RSRP to a B2 handover threshold and/or compares the 5GNR RSRP to a B1 threshold. At this point, the LTE RSRP is not sufficiently strong and triggers the B2 threshold while the 5GNR RSRP is large enough to trigger the B1 and/or B2 threshold. Consequently, the RRC determines that handover conditions exist. In response and based on the 5GNR capabilities of UE 601, the RRC in BBU 622 transfers handover command to RRC 703 over the LTE PDCPs, RLCs, MACs, and PHYs. The RRC in BBU 622 directs the RRC in CU 613 to serve UE 601 over their X2 interface and notifies the MME in EPC 640 that handover to 5G RAN 610 is required over their N26 interface. The MME in EPC 640 interfaces with the AMF in 5GC 630 to reroute the voice connection over the UPF in 5GC 630 and RAN 610.

In response to the handover command, RRC 703 directs the LTE PDCP, RLC, MAC, and PHY to detach from LTE RAN 620. RRC 703 transfers attachment signaling to the RRC in CU 613 over the PDCPs, RLCs, MACs, and PHYs. Prior to completing the handover, RRC 703 directs CN 704 to set a handover timer to generate comfort noise if the time-to-handover is excessive. CN 704 sets the handover timer and monitors for downlink voice packets received from RAN 610 and for uplink voice packets sent by UE 601 to detect when handover is complete. In this example, the handover timer expires, and CN 704 retrieves the cached network generated comfort noise packets from memory. CN 704 generates additional comfort noise packets based on the network generated comfort noise packets. UE 601 uses the comfort noise packets generated by CN 704 to play comfort noise.

While the UE 601 is playing comfort noise, UE 601 wirelessly attaches to 5G RAN 610. RRC 703 transfers a registration request to the RRC in CU 613 over the 5GNR PDCPs, RLCs, MACs, and PHYs. The RRC in CU 613 transfers the registration request for UE 601 to the AMF in 5GC 630. The AMF correlates the registration request to the handover indication received from the MME in EPC 640 and transfers a UE context request to the MME. The MME transfers the UE context to the AMF. The AMF transfers an identity request for UE 601 to the RRC in CU 613 which forwards the request to RRC 703 over the 5GNR PDCPs, RLCs, MACS, and PHYs. RRC 703 transfers an identity indication to the RRC in CU 613 over the PDCPs, RLCs, MACs, and PHYs. The RRC in CU 613 transfers the identity indication to the AMF. The AMF interacts with the other network functions in 5GC 630 to authenticate and authorize UE 601 for wireless data services.

Responsive to the authentication and authorization, the AMF uses the UE context to organize the other network functions in 5GC 630 to support the voice call between UE 601 and the terminating UE. Once the end-to-end connection between UE 601 and the terminating UE is reestablished, the handover is completed, and the voice call may resume. The AMF transfers a registration complete accept message to the RRC in CU 613 which forwards the registration accept message to RRC 703 over the PDCPs, RLCs, MACs, and PHYs. The executing user application in UE 601 generates additional voice data. The SDAP exchanges the uplink and downlink voice data over the 5GNR PDCPs, RLCs, MACs, and PHYs with the SDAP in CU 613. The SDAP in CU 613 exchanges the voice data with the UPF in 5GC 630. The UPF exchanges the voice data with external systems for delivery to the terminating UE. CN 704 detects the exchange of voice data and determines handover is complete. In response, CN 704 stops generating comfort noise packets and UE 601 stops playing the comfort noise generated by CN 704 for the user.

The wireless data network circuitry described above comprises computer hardware and software that form special-purpose network circuitry to induce comfort noise in wireless user devices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to induce comfort noise in wireless user devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to provide comfort noise during handover, the method comprising:
   receiving, at a wireless user device during a voice call, a handover command from a source access node that detected a handover condition for the wireless user device and signaled a target access node to serve the wireless user device, the handover command directing the wireless user device to handover to the target access node;
   in response to receiving the handover command, detaching the wireless user device from the source access node, wirelessly transferring an attachment signaling to the target access node via the wireless user device, and setting a handover timer at the wireless user device;
   generating the comfort noise for delivery to a user via the wireless user device at least in response to an expiration of the handover timer.

2. The method of claim 1 further comprising:
   attaching the wireless user device to the target access node; and
   in response to the wireless user device wirelessly exchanging voice packets with the target access node, ceasing generation of the comfort noise.

3. The method of claim 1 wherein the wireless user device setting the handover timer, determining when the handover timer expires, and generating the comfort noise comprises:
   setting the handover timer;
   measuring for transmission or reception of at least one voice packet;
   determining that the wireless user device has not received or transmitted any voice packet during a duration of the handover timer; and
   in response to the wireless user device not detecting transmission or reception of the voice packets during the duration of the handover timer, generating the comfort noise via the wireless user device at the expiration of the handover timer.

4. The method of claim 1 wherein the comfort noise comprises synthetic background noise for the user in response to an absence of voice packets.

5. The method of claim 1 further comprising the wireless user device executing a Radio Resource Control (RRC) and an application layer.

6. The method of claim 5 wherein the wireless user device receiving the handover command from the source access node, setting the handover timer, determining when the handover timer expires, and generating the comfort noise in response to the handover command and the expiration of the handover timer comprises:
   the RRC receiving the handover command from the source access node and notifying the application layer of the handover command;
   the application layer receiving the notification of the handover command from the RRC and in response, setting the handover timer, measuring for voice packets, and determining that the wireless user device has not received or transmitted any voice packet during a duration of the handover timer; and
   the application layer generating the comfort noise in response to the notification from the RRC, the user device not receiving or transmitting any voice packet during the duration of the handover timer, and the expiration of the handover timer.

7. The method of claim 1 wherein the source access node comprises a Fifth Generation New Radio (5GNR) Radio Access Network (RAN) and the target access node comprises a Long Term Evolution (LTE) RAN.

8. A wireless communication network configured to provide comfort noise during handover, the wireless communication network comprising:

a source access node;

a target access node;

a wireless user device configured to;

receive, during a voice call, a handover command from the source access node that detected a handover condition for the wireless user device and signaled the target access node to serve the wireless user device, the handover command directing the wireless user device to handover to the target access node;

in response to receiving the handover command from the source access node, detach from the source access node, wirelessly transfer an attachment signaling to the target access node, and set a handover timer; and generate the comfort noise for delivery to a user at least in response to an expiration of the handover timer.

9. The wireless communication network of claim 8 wherein the wireless user device is further configured to:

attach to the target access node; and in response to the wireless user device exchanging the voice packets with the target access node, cease generation of the comfort noise.

10. The wireless communication network of claim 8 wherein the wireless user device configured to generate the comfort noise comprises the wireless user device further configured to:

measure for transmission or reception of at least one voice packet;

determine that the wireless user device has not received or transmitted any voice packet during a duration of the handover timer; and in response to the wireless user device not receiving or transmitting any voice packet during the duration of the handover timer, generate the comfort noise via the wireless user device at the expiration of the handover timer.

11. The wireless communication network of claim 8 wherein the comfort noise comprises synthetic background noise for the user in response to an absence of voice packets.

12. The wireless communication network of claim 8 wherein the wireless user device comprises a Radio Resource Control (RRC) and an application layer.

13. The wireless communication network of claim 12 wherein:

the RRC is configured to receive the handover command from the source access node and notify the application layer of the handover command;

the application layer is configured to receive the notification of the handover command from the RRC and in response, set the handover timer, measure for transmission or reception of at least one voice packet, and determine that the wireless user device has not received or transmitted any voice packet during a duration of the handover timer; and the application layer is further configured to generate the comfort noise in response to the notification from the RRC, the wireless user device not receiving or transmitting any voice packet during the duration of the handover timer, and the expiration of the handover timer.

14. The wireless communication network of claim 8 wherein the source access node comprises a Fifth Genera-tion New Radio (5GNR) Radio Access Network (RAN) and the target access node comprises a Long Term Evolution (LTE) RAN.

15. A wireless user device configured to provide comfort noise during handover, the wireless user device comprising:

device circuitry and radio circuitry;

the radio circuitry configured to wirelessly exchange voice packets for a voice call with a source access node, receive a handover command that indicates a target access node from the source access node, and transfer the handover command to the device circuitry;

the device circuitry configured to receive the handover command, an in response to receiving the handover command, detach from the source access node, transfer an attachment signaling for the target access node to the radio circuitry, set a handover timer, and determine when the handover timer expires;

the radio circuitry further configured to wirelessly transfer the an attachment signaling to the target access node; and in response to an expiration of the handover timer, the device circuitry further configured to generate the comfort noise for delivery to a user.

16. The wireless user device of claim 15 wherein:

the radio circuitry is further configured to wirelessly attach to the target access node and wirelessly exchange additional voice packets for the voice call with the target access node; and the device circuitry is further configured to cease the generation of the comfort noise in response to the exchange of the additional voice packets.

17. The wireless user device of claim 15 wherein:

the device circuitry is further configured to set the handover timer, measure for transmission or reception of at least one voice packet, and determine that the radio circuitry has not received any voice packet during a duration of the handover timer; and the device circuitry is further configured to generate the comfort noise in response to the handover command, the radio circuitry not receiving or transmitting any voice packet during the duration of the handover timer, and the expiration of the handover timer.

18. The wireless user device of claim 15 wherein the comfort noise comprises synthetic background noise for the user in response to an absence of the downlink voice packets.

19. The wireless user device of claim 15 wherein the device circuitry comprises a Radio Resource Control (RRC) and an application layer.

20. The wireless user device of claim 19 wherein:

the RRC is configured to receive the handover command from the radio circuitry and notify the application layer of the handover command;

the application layer is configured to receive the notification of the handover command from the RRC and in response, set the handover timer, measure for transmission or reception of at least one voice packet, and determine that the radio circuitry has not received or transmitted any voice packet during a duration of the handover timer; and the application layer is further configured to generate the comfort noise in response to the notification from the RRC, the radio circuitry not receiving or transmitting any voice packet during the duration of the handover timer, and the expiration of the handover timer.

* * * * *